March 29, 1932.    F. PROTZER    1,851,062
SELF CLOSING VALVE
Filed Sept. 11, 1930
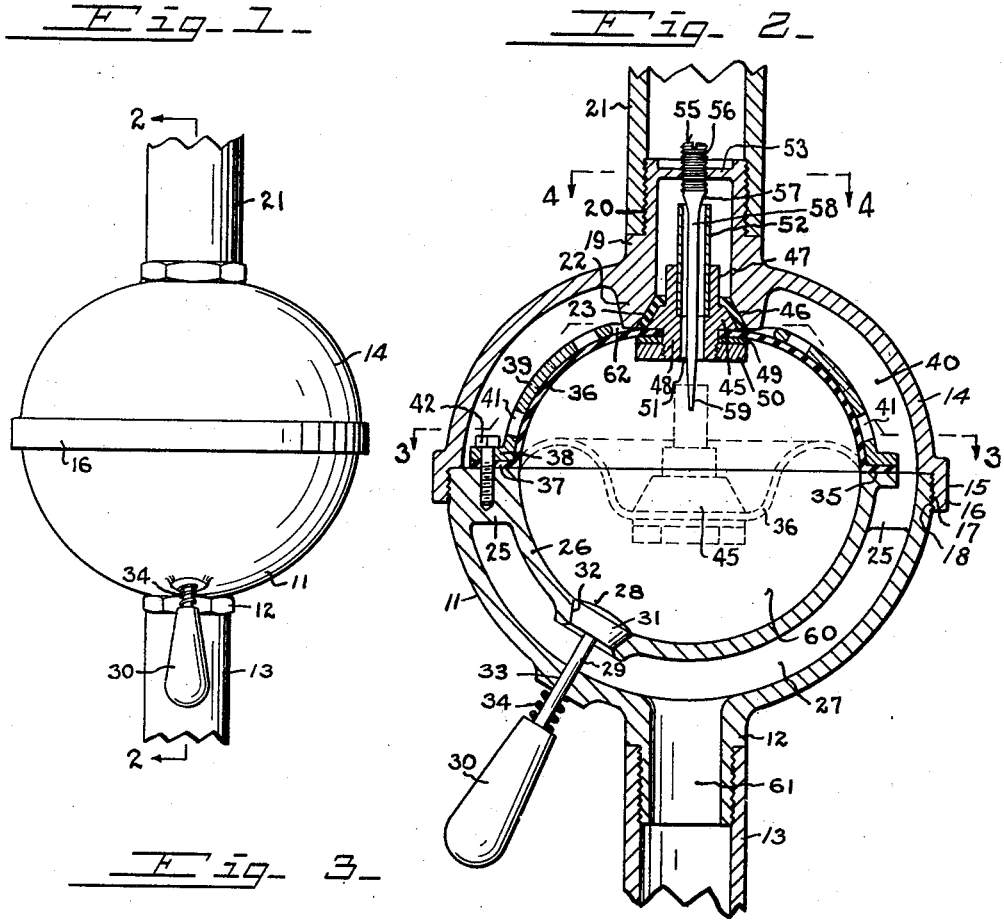
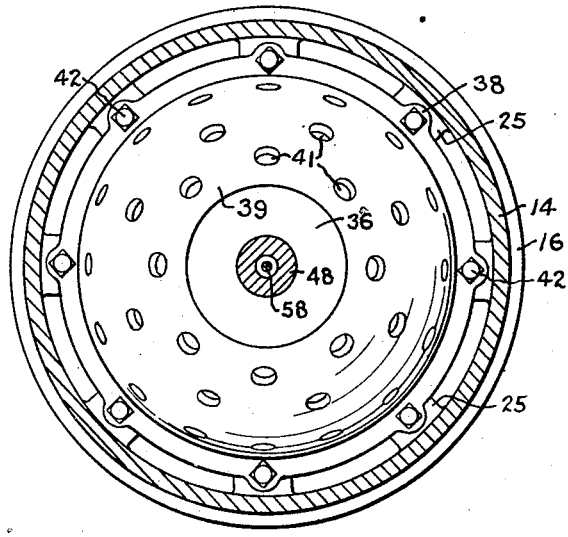
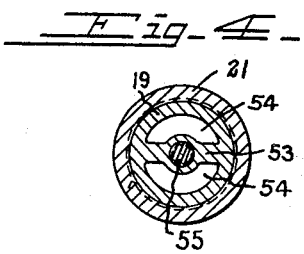
INVENTOR
FRITZ PROTZER.
BY
H.C. Kavel.
ATTORNEY Patented Mar. 29, 1932

1,851,062

UNITED STATES PATENT OFFICE

FRITZ PROTZER, OF NORWOOD, OHIO

SELF-CLOSING VALVE

Application filed September 11, 1930. Serial No. 481,151.

My invention relates to a new and useful improvement in a self closing valve adapted to be interposed in a fluid conductor for controlling the flow of fluid through the conductor.

It is especially useful in connection with the control of the flow of fluid at periodic intervals or short intervals, such as flushing closet bowls and the like. When used in connection with the flushing of closet bowls, the device has proven most efficient, supplying the necessary flow of water to the closet bowl to effect the desired siphonage, while at the same time eliminating the noise incident to the flushing operation and permitting a leakage of fluid at a reduced volume to permit the trap in the bowl to seal itself prior to complete closing of the valve.

This invention is an improvement on the device disclosed in Patent Number 1,741,250 granted to me December 31, 1929.

It is an object of the present invention to provide a self-closing valve of this type which will attain the advantages mentioned.

It is a further object to provide the valve with a guard for limiting the outward movement of the valve closer.

A further object is to provide the valve with means for reducing the flow of liquid prior to the closing of the valve, permitting sealing of the trap in the closet bowl.

A still further object is to provide means for keeping the refill pipe clean and slowing up the refill prior to the complete closing of the valve.

The invention will be further readily understood from the following description and claim, and from the drawings in which latter:

Fig. 1 is a front elevation of the invention, partly broken away;

Fig. 2 is a vertical sectional view, taken on the line 2—2 of Fig. 1 and partly broken away;

Fig. 3 is a horizontal section, taken on the irregular line 3—3 of Fig. 2; and

Fig. 4 is a detail section, taken in the plane of the line 4—4 of Fig. 2.

The invention comprises a semi-spherical body portion 11, provided with a downwardly projecting neck 12 exteriorly threaded to form connection with a pipe or conductor 13. A semi-spherical body 14 is outwardly offset as at 15 to form a flange 16 provided with internal threads 17 arranged to engage threads 18 on the upper end of lower semi-spherical body 11. A neck 19 extends upwardly from the body 14 and has threaded connection 20 with a pipe or conductor 21. Projecting inwardly from the body 14 is a boss 22 having a valve seat 23 formed at its inner end.

The lower body portion has inwardly extending ribs 25 connecting an inner spherical wall 26 to the outer body, for forming a fluid space 27 between the walls. A valve 28 is provided with a stem 29 and a handle 30. The head 31 of the valve is arranged to seat on a valve seat 32 in the inner wall and the stem extends through an aperture 33 in the outer wall for guiding the valve. A spring 34 is received about the stem and is interposed between the handle and the outer wall to normally maintain the valve in closed position.

The upper edge of the lower, inner, semi-spherical body forms a clamping face 35. A semi-spherical flexible member 36, which is preferably made of rubber, has an outwardly extending flange 37 arranged to be clamped between a flange 38 on a semi-spherical protector 39 and the clamping face 35. The protector is spaced from the outer wall to form a fluid space 40 between said members. This protector is provided with apertures 41 for permitting fluid to pass therethrough. Screws 42 received through holes in the flanges of the protector and flexible member are threaded into the ribs 25.

A vlave 45 is provided with a conical face 46, which may be of hard rubber, arranged to seat on the valve seat 23. The valve has an upwardly extending boss 47 for the purpose of partially closing the valve port prior to full closing of the valve, thereby reducing the flow of liquid through the pipe for a short interval before the valve completely closes. The valve is provided with a reduced shank 48 at its opposite end. The member 36 is received over the shank and clamped between the valve and washer 49 by means of a nut 50 threaded over the threaded end of the shank.

The valve is provided with a central bore 51 and has a tube 52 forming an extension of said bore extending upwardly therefrom. The upper end of the neck 19 has a cross rib 53 therein with fluid spaces 54 at each side thereof. A guide 55 has a threaded end 56 arranged to be threaded into a threaded hole in the cross rib. Below the threads the guide pin tapers as at 57 to the straight shank 58 and has a tapered end 59. This guide pin acts as a guide for the valve and also keeps the passage clean. The guide is adjustable for the purpose of decreasing the space between the tube and the tapered portion of the guide pin, whereby the flow of fluid to the inner chamber 60 of the valve may be regulated for slowing up the valve just prior to closing.

In the operation of the invention, the parts are in the position shown in full lines in Fig. 2 with the space 60 filled with fluid. When it is desired to flush the closet bowl, the handle 30 is pushed inwardly releasing the valve 28 from its seat 32, thereby permitting the fluid within the chamber 60 to flow through the port 61 and pipe 13. The fluid leaving the chamber 60 together with the pressure of the fluid on the head of the valve will cause the flexible member 36 to collapse, thus moving the valve 45 downwardly to the position shown in dotted lines in Fig. 2.

As soon as the valve 45 leaves its seat the fluid will flow under pressure from the pipe 21 and pass through the apertures 41 and also the space 62 between the protector and the boss 22, into the space 40, thence into the space 27 and through the outlet 61. When the pressure on the handle 30 is released, the spring 34 will cause the valve 28 to close. The tube 52 having descended on the guide 55 permits the fluid to flow through the tube 52 and the bore 51 for refilling the chamber 60. As the valve gradually ascends, the boss 47 entering the valve opening reduces the flow of liquid through the pipe 13, thereby stopping the flushing operation and causes the usual trap in the closet bowl to seal itself and fill to the desired level. Concurrent to the reduced flow of liquid to the closet bowl, the tube 52 will be climbing on the taper 57 of the guide pin for reducing the flow of liquid to the chamber 60 for slowing up the closing of the valve 45. The valve 45 seating on its seat 23 completely shuts off the flow of liquid to the closet bowl, and the pressure of the fluid within the chamber 60 maintains the valve in closed position. The protector 39 prevents undue expansion of the flexible member which I have found will increase the life of the valve many times over valves without this protecting member.

Having thus fully described my invention what I claim as new and desire to secure by Letters Patent, is:

A valve of the class described comprising a substantially spherical container having a pair of metallic sections threaded together at their open ends, one of said sections having an inlet opening and the other having an outlet opening, a valve seat extending inwardly of said container at said inlet opening, a secondary pair of semi-spherical members spaced within said first named spherical members and joined thereto by spaced apart ribs, one of said inner semi-spherical members provided with fluid passages and the other with a manual valve, a semi-spherical flexible member arranged adjacent to said member provided with fluid passages, said flexible member clamped between said secondary members, a valve mounted on said flexible member and adapted upon distension of said flexible member for engaging in said seat and closing communication of said container with said inlet opening, said last named valve provided with an extension for partially closing said valve prior to the seating of said valve, a tube extending upwardly from said valve and an adjustable guide positioned in said intake port and extending through said tube and valve, said guide provided with a shank tapered adjacent the upper end and lower end for changing the volume of fluid passing through said tube.

In testimony whereof I have hereunto signed my name.

FRITZ PROTZER.